US006426057B1

(12) United States Patent
Maurer

(10) Patent No.: US 6,426,057 B1
(45) Date of Patent: Jul. 30, 2002

(54) PROCESS FOR CONTINUOUS OXIDATION

(75) Inventor: Bernhard Maurer, Feistritz/Drau (AT)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/987,698

(22) Filed: Nov. 15, 2001

(30) Foreign Application Priority Data

Nov. 24, 2000 (EP) .............................................. 00125715

(51) Int. Cl.[7] ...................... C01B 15/023; C07C 409/00
(52) U.S. Cl. ....................... 423/588; 568/569; 568/572; 568/573; 568/577
(58) Field of Search ................................. 568/569, 572, 568/573, 577; 423/588

(56) References Cited

U.S. PATENT DOCUMENTS

| 2,902,347 A | | 9/1959 | Cosby et al. |
| 3,073,680 A | | 1/1963 | Jenney et al. |
| 3,472,630 A | * | 10/1969 | Baldwin et al. |
| 3,752,885 A | * | 8/1973 | Liebert et al. |
| 4,428,922 A | | 1/1984 | Hopkins |

FOREIGN PATENT DOCUMENTS

| DE | 2003 268 | 7/1971 |
| GB | 1008191 | 10/1965 |
| WO | WO 89/06710 | 11/1986 |

OTHER PUBLICATIONS

Copy of European Search Report (German language) in counterpart appln. No. EP 00 12 5715, dated Apr. 2, 2001.

* cited by examiner

Primary Examiner—Johann Richter
Assistant Examiner—Sikarl A. Witherspoon
(74) Attorney, Agent, or Firm—Smith, Gambrell & Russell, LLP

(57) ABSTRACT

A continuous process for oxidation, in which the substance to be oxidized and the oxidizing gas flow countercurrently and the oxidizing gas is mixed with a split stream containing preoxidized substance before it enters the reactor. A Venturi nozzle is particularly suitable as the mixing organ in the reactor.

25 Claims, 1 Drawing Sheet

Figure
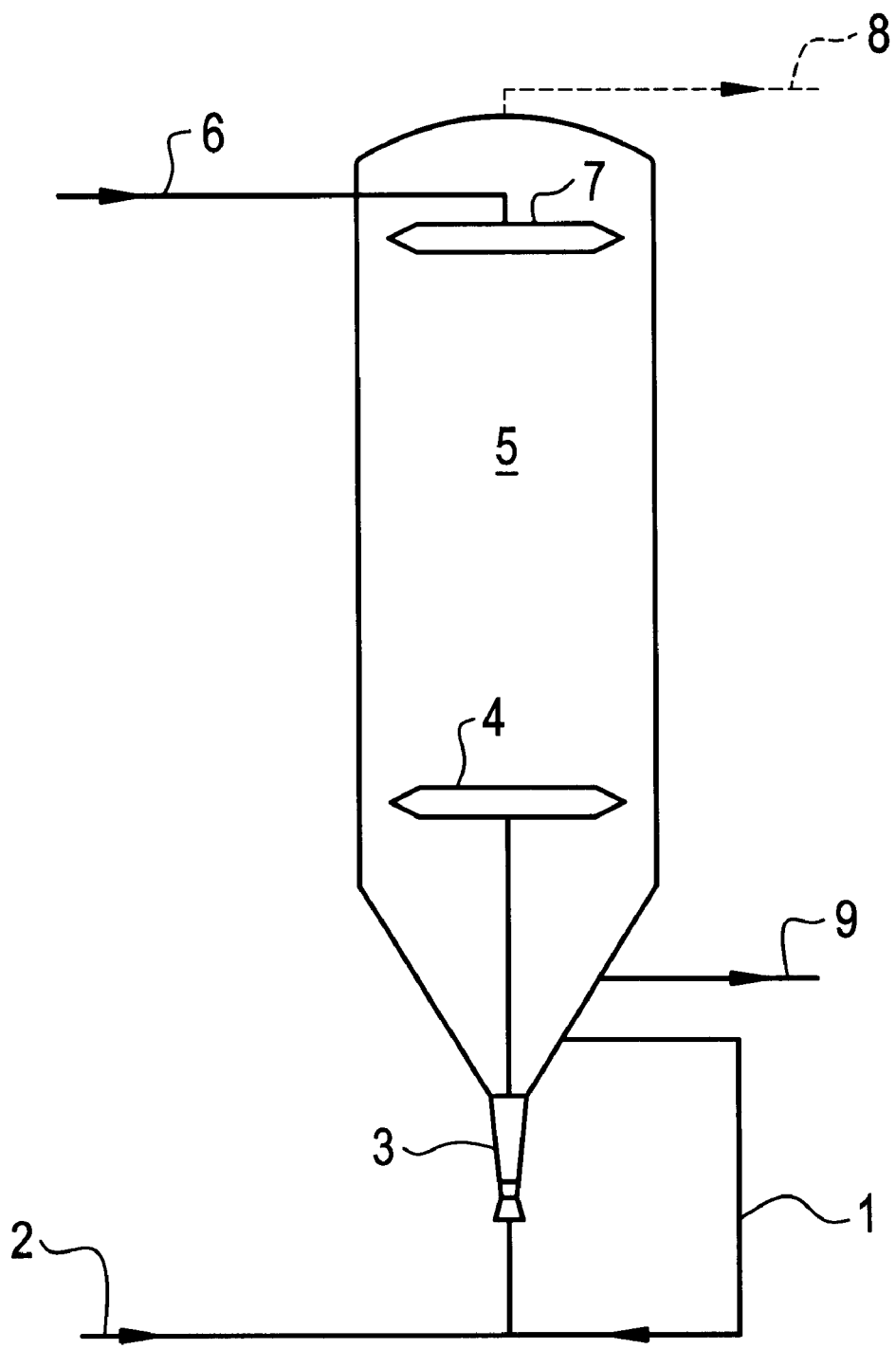

PROCESS FOR CONTINUOUS OXIDATION

INTRODUCTION AND BACKGROUND

The present invention concerns a continuous process for oxidation. This process is particularly suitable for the oxidation step in the anthraquinone process for production of hydrogen peroxide, in which substituted anthrahydroquinones are oxidized by oxidation with an oxygen-containing gas to form substituted anthraquinones and hydrogen peroxide.

In the anthraquinone process this oxidation was initially performed cocurrently in gas distribution towers connected in series using fresh air in each tower, which was both technically complicated and uneconomic. Although the oxidation rate could be increased in a cocurrent flow of air and working solution according to U.S. Pat. No. 3,073,680 whilst retaining specific bubble sizes, obtainable by means of fine-pore gas distributor organs and specific cross-sectional loads, problems arose with the removal of the resulting foam and with the gas-liquid phase separation.

U.S. Pat. No. 2,902,347 describes the performance of oxidation using a countercurrent process. The hydroquinone solution to be oxidized is charged into the top of a packed column and flows countercurrently to the rising air metered into the base of the column. The disadvantage of this type of countercurrent flow is a very low flooding limit in the column, which means that several columns have to be connected in series in order to achieve as complete a conversion as possible.

DE-A-20 03 268 describes a combination of cocurrent and countercurrent flow. The problems cited above can be resolved by means of an oxidation column divided into two to six sections. In each section of this column the working solution and oxidation gas flow cocurrently from bottom to top, but viewed from the column as a whole the gas and liquid move countercurrently to each other. The disadvantage of this cascade-type arrangement is the pressure drop due to fittings such as perforated plates, gauze or packing bodies, which are necessary for intimate and thorough mixing.

In order to reduce the pressure drop in the cascade-type column arrangement described above, EP-A-221 931 suggests performing the oxidation in a cocurrent reactor with no fittings. The hydrogenated working solution and oxidation gas produce a coalescence-inhibited system in which the gas bubbles, once formed, retain their size in the absence of any external influence. The disadvantage of this design proved to be that the reactor volume to be aerated ($m^3$ per t $H_2O_2$) is quite large, which leads to a lower space-time yield and to a high hold-up of expensive working solution. In addition the cocurrent flow leads to an increased proportion of degradation products.

An object of the present invention is therefore to increase the efficiency of a continuous oxidation consisting of the reaction mixture comprising the substance to be oxidized and the oxidizing gas.

SUMMARY OF THE INVENTION

The above and other objects of the present invention can be achieved by passing the liquid medium containing the substance to be oxidized and the oxidizing gas countercurrently during the continuous oxidation, whereby the oxidizing gas is mixed with a split stream containing preoxidized or partially oxidized substance before it enters the reactor, which is designed to be substantially free from coalescence-promoting fittings other than at least one distributor organ.

This result is surprising, since recycling a preoxidized split stream of product would normally reduce the space-time yield in the reactor. In fact the effect of mixing this split product stream with the oxidation gas before it enters the reactor, which is designed to be substantially free from coalescence-promoting fittings, is that the bubbles generated in the mixing organ retain their set size. This results in a reaction rate across the entire volume of the unencumbered reactor that is significantly higher than that achieved without premixing. This more than compensates for the loss in space-time yield arising from the recycling of a split product stream.

At the same time the countercurrent flow suppresses the formation of byproducts such as is known from a cocurrent flow. The premixing also increases the degree of oxidation. By bringing the split product stream into contact with fresh oxidation gas, further portions of unoxidized substance are reacted.

In order to maintain the bubble size set in the mixing organ during the course of the reaction, oxidation reactors are used that are free from coalescence-promoting fittings. Plate-type heat exchangers can optionally be fitted, particularly in order to achieve an isothermic reaction process. The stacks of heat exchangers should be fitted in such a way that they do not interrupt the medium in its direction of flow in the reactor, and the gap width of a plate-type heat exchanger should be chosen such that it does not cause any coalescence.

BRIEF DESCRIPTION OF DRAWINGS

The present invention will be further understood with reference to the accompanying drawing which is a schematic representation of an apparatus useful for carrying out this invention.

DETAILED DESCRIPTION OF INVENTION

The process according to the invention can preferably be performed in such a way that the gas bubbles generated in the mixing organ have a maximum diameter of 2.5 mm, particularly preferably of less than 1.5 mm, in order to permit a rapid transfer to the liquid phase.

Examples of possible mixing organs with which this size of gas bubble can be achieved include perforated plates, diffuser stones, static mixers or nozzles.

A Venturi nozzle is particularly suitable for the process according to the invention. This known device has a lower pressure drop in comparison to other mixing organs. Depending on the energy supplied and the volumetric flow rate, the nominal width of the channel is set in such a way that the maximum gas bubble diameter does not exceed 2.5 mm.

The mixing organ is preferably positioned in such a way that the preoxidized substance can pass from the oxidation reactor to the mixing organ by natural circulation. The mixing organ can be fitted directly to the base or to the side wall of the oxidation reactor close to the base, on the inside or outside. However, it can also be located separately from the reactor, vertically or horizontally, and connected to it by a line, provided that the difference in height between them is sufficient for the preferred natural circulation. With this arrangement there is no need for additional gas jets or pumps.

The reactors used for purposes of this invention are free of coalescence promoting fittings that would result in gas bubbles having a diameter greater than 2.5 mm.

A particularly preferred embodiment of the process according to the invention is to perform the oxidation in a coalescence-inhibited system. Coalescence-inhibited systems are gas/liquid systems in which the gas bubbles retain their size in the absence of any external influence. This behaviour is governed by interface-influencing values of the liquid, such as viscosity and specific surface tension, as well as by the type of gas.

As described in EP-A-221 931, the working solutions used as the liquid phase in the AO process for producing hydrogen peroxide satisfy the conditions for a coalescence-inhibited system if the total quotient of all interfacial tensions of the components involved reaches at least 16 mN/m, with 17 to 25 mN/m being preferred.

A simple experiment can be used to determine whether oxidized or partially oxidized working solutions containing hydrogen peroxide, and oxygen or an oxygen-containing gas form a coalescence-inhibited system when the above condition for the total quotients of all interfacial tensions of the components involved is fulfilled. This ensures that, provided that the components of the reaction system and their relative quantities are chosen accordingly, a coalescence-inhibited system is formed when oxygen or an oxygen-containing gas and oxidized or partially oxidized working solution containing hydrogen peroxide are premixed and is maintained in the oxidation reactor.

In order to obtain as quantitative an oxidation as possible with a degree of oxidation greater than 90%, the gas component of the premix of oxidation gas and preoxidized substance should be over 30 vol. %, preferably over 40 vol. %. The range between 50 and 60 vol. % is particularly preferred.

The process according to the invention, particularly in the process specified above, is suitable for the autoxidation of
a) substituted anthrahydroquinones or mixtures of substituted anthrahydroquinones,
b) partially ring-hydrogenated alpha- and beta-tetrahydro derivatives thereof and mixtures of a) and b) to form the corresponding anthraquinones and tetrahydroanthraquinones.

2-alkyl-substituted anthrahydroquinones and mixtures thereof, with an alkyl radical having 1 to 8 C atoms, which can be linear or branched, are used above all. Examples of these include 2-ethyl, 2-amyl and 2-tert-butyl anthrahydroquinone and tetrahydroanthrahydroquinone derivatives thereof, as well as mixtures of several anthrahydroquinones and tetrahydroanthrahydroquinone derivatives thereof.

The continuous oxidation according to the invention is not restricted to the oxidation of anthrahydroquinones, but can also be used for other gas/liquid autoxidations, such as e.g. the oxidation of toluene to benzoic acid, of cumene to cumene hydroperoxide, of p-xylene to terephthalic acid. If catalysts are also to be used, they must be dissolved or suspended in the reaction mixture to avoid coalescence of the gas bubbles as far as possible.

The substance to be oxidized can be introduced as is if it is liquid under the operating conditions or in solution. Anthrahydroquinones are preferably dissolved in a solvent blend containing a quinone solvent and a hydroquinone solvent.

Known quinone solvents are benzene, tert-butyl benzene, tert-butyl toluene, trimethylbenzene, polyalkylated benzenes and methylnaphthalene.

Known hydroquinone solvents are alkyl phosphates, alkyl phosphonates, nonyl alcohols, alkyl cyclohexanol esters, N,N-dialkyl carbonamides, tetraalkyl ureas, N-alkyl-2-pyrrolidones.

In the oxidation of substituted anthrahydroquinones in the AO process to produce hydrogen peroxide, the premixing of air and liquid phase according to the invention is preferably performed in the type of reactor free from fittings that is described above. A split stream of preoxidized or partially oxidized substance containing hydrogen peroxide and the oxidizing gas flow cocurrently and the substance to be oxidized flows countercurrently. The hydrogen peroxide dissolved in the organic solvent blend described above that is formed during oxidation is extracted with water in a downstream reaction step. The substituted anthraquinone is sent for catalytic hydrogenation, the product of which is substituted anthrahydroquinone, which is oxidised again as described above.

The drawing illustrates an embodiment of an oxidation reactor with premixing of the oxidizing gas and the mixture of preoxidized or partially oxidized substance and hydrogen peroxide as liquid phase. Preoxidized substance 1 and the oxidation gas 2 are transferred to the oxidation reactor 5 via the mixing organ 3 by means of a distributor 4. In the upper part of the reactor the substance to be oxidized is introduced into the reactor through the line 6 and distributed uniformly over the cross-section of the reactor by means of the distributor 7. It then flows countercurrently to the premixed gas/liquid phase. Unreacted oxidation gas leaves the reactor through the line 8 and passes to a gas separator. The oxidized substance is fed through the line 9 to be extracted.

Further variations and modifications of the foregoing will be apparent to those skilled in the art and are intended to be encompassed by the claims appended hereto.

European patent application 00 125 715.3 filed Nov. 24, 2000 is relied on and incorporated herein by reference.

I claim:

1. A continuous process for oxidation in which a liquid medium containing a substance to be oxidized and an oxidizing gas flow countercurrently in a reactor,
comprising mixing the oxidizing gas with a split stream containing preoxidized or partially oxidized said substance before said substance enters said reactor, which is designed to be substantially free from coalescence-promoting fittings other than at least one distributor organ.

2. The process according to claim 1, wherein preoxidized or partially oxidized substance and oxidizing gas are mixed in such a way that the diameter of gas bubbles generated is a maximum of 2.5 mm.

3. The process according to claim 1, wherein preoxidized or partially oxidized substance and oxidizing gas are mixed in such a way that the diameter of gas bubbles generated is less than 1.5 mm.

4. The process according to claim 1, wherein said organ is a Venturi nozzle, a perforated plate or diffuser stones.

5. The process according to claim 2, wherein said organ is a Venturi nozzle, a perforated plate or diffuser stones.

6. The process according to claim 3, wherein said organ is a Venturi nozzle, a perforated plate or diffuser stones.

7. The process according to claim 1, wherein the distribution organ is positioned with a reactor in such a way that the oxidized or partially oxidized substance can pass from the oxidation reactor to the distribution organ by natural circulation.

8. The process according to claim 2, wherein the distribution organ is positioned with a reactor in such a way that the oxidized or partially oxidized substance can pass from the oxidation reactor to the distribution organ by natural circulation.

9. The process according to claim 3, wherein the distribution organ is positioned with a reactor in such a way that the oxidized or partially oxidized substance can pass from the oxidation reactor to the distribution organ by natural circulation.

10. The process according to claim 4, wherein the distribution organ is positioned with a reactor in such a way that the oxidized or partially oxidized substance can pass from the oxidation reactor to the distribution organ by natural circulation.

11. The process according to claim 1, wherein coalescence-inhibited gas/liquid systems are used in whose liquid phases the total quotient of all specific interfacial tensions of the components involved reaches a value of at least 16 mN/m.

12. The process according to claim 2, wherein coalescence-inhibited gas/liquid systems are used in whose liquid phases the total quotient of all specific interfacial tensions of the components involved reaches a value of at least 16 mN/m.

13. The process according to claim 4, wherein coalescence-inhibited gas/liquid systems are used in whose liquid phases the total quotient of all specific interfacial tensions of the components involved reaches a value of at least 16 mN/m.

14. The process according to claim 7, wherein coalescence-inhibited gas/liquid systems are used in whose liquid phases the total quotient of all specific interfacial tensions of the components involved reaches a value of at least 16 mN/m.

15. The process according to claim 1, wherein the mixture of oxidizing gas and oxidized substance has a gas component of 40 vol. % to 60 vol. %.

16. The process according to claim 2, wherein the mixture of oxidizing gas and oxidized substance has a gas component of 40 vol. % to 60 vol. %.

17. The process according to claim 4, wherein the mixture of oxidizing gas and oxidized substance has a gas component of 40 vol. % to 60 vol. %.

18. The process according to claim 7, wherein the mixture of oxidizing gas and oxidized substance has a gas component of 40 vol. % to 60 vol. %.

19. The process according to claim 11, wherein the mixture of oxidizing gas and oxidized substance has a gas component of 40 vol. % to 60 vol. %.

20. The process according to claim 1, wherein the substance to be oxidized is a substituted anthrahydroquinone or a mixture of substituted anthrahydroquinones and/or ring-hydrogenated tetrahydro derivatives thereof.

21. The process according to claim 1, wherein the substance to be oxidized is introduced as a solution or in solution.

22. A process for the production of hydrogen peroxide by the anthraquinone cyclic process, comprising catalytic hydrogenation, oxidation of the hydrogenated working solution with oxygen or an oxygen-containing gas, whereby a mixture containing hydrogen peroxide and substituted anthraquinone or its ring-hydrogenated tetrahydroanthraquinone is obtained, and extraction of the hydrogen peroxide from the mixture obtained after oxidation, wherein the oxidation is performed by continuously oxidizing a liquid medium containing a substance which is substituted anthrahydroquinone or a mixture of substituted anthrahydroquinones and/or a ring hydrogenated tetrahydro derivative thereof, by flowing said liquid and an oxidizing gas countercurrent to each other, said oxidizing gas being mixed with a split stream containing preoxidized or partially oxidized said substance, before said substance enters a reactor, which is designed to be substantially free from coalescence-promoting fittings other than at least one distributor organ.

23. The process according to claim 22, wherein said substance is introduced as a solution or in solution.

24. The process according to claim 23, wherein a solvent is present which is a quinone solvent.

25. The process according to claim 23, wherein a solvent is present which is a hydroquinone solvent.

* * * * *